Feb. 1, 1944.    G. MAURER    2,340,607
PRESS
Original Filed Dec. 13, 1939    6 Sheets—Sheet 1

INVENTOR
GOTTFRIED MAURER
BY Young, Emery & Thompson
ATTYS.

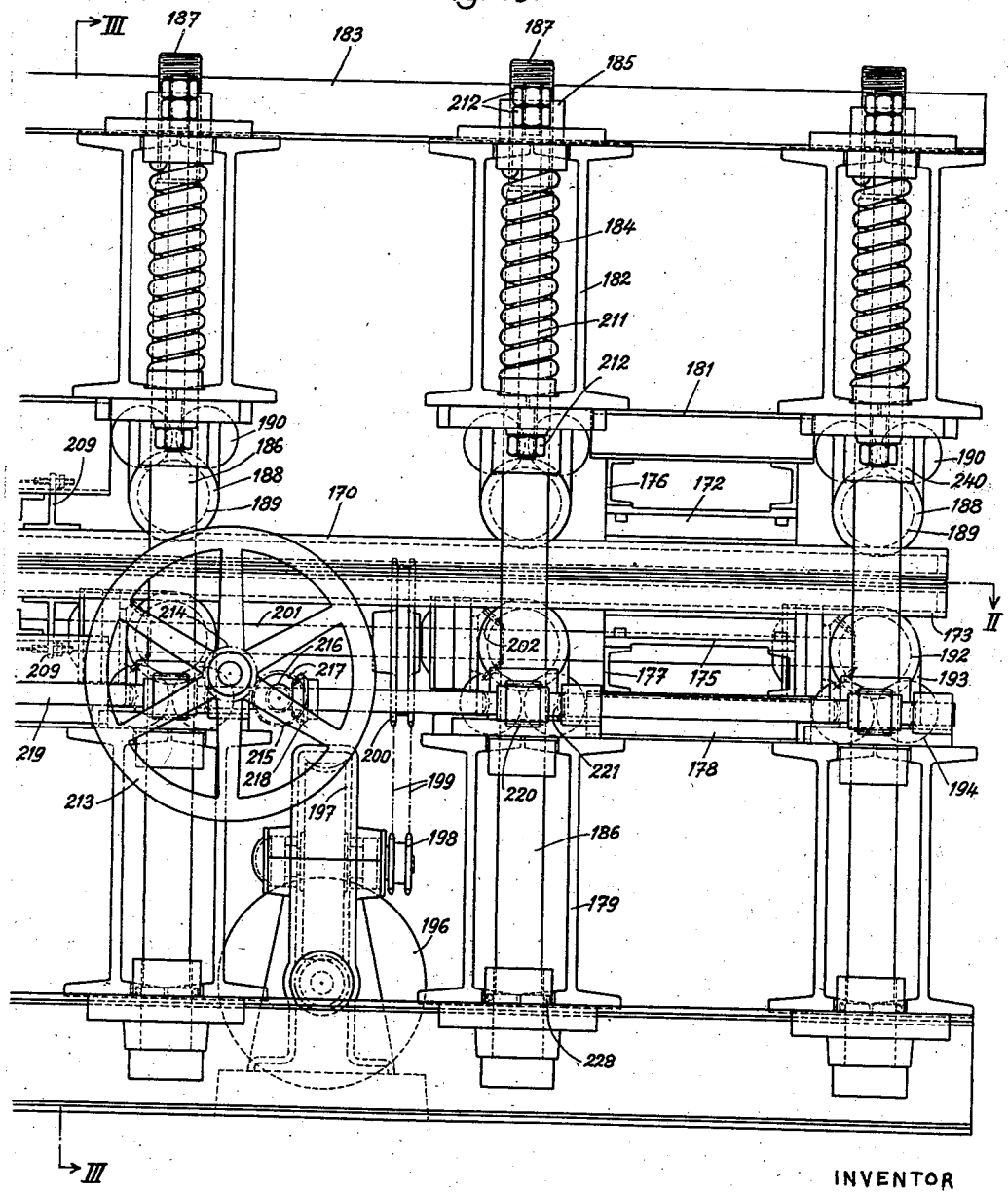

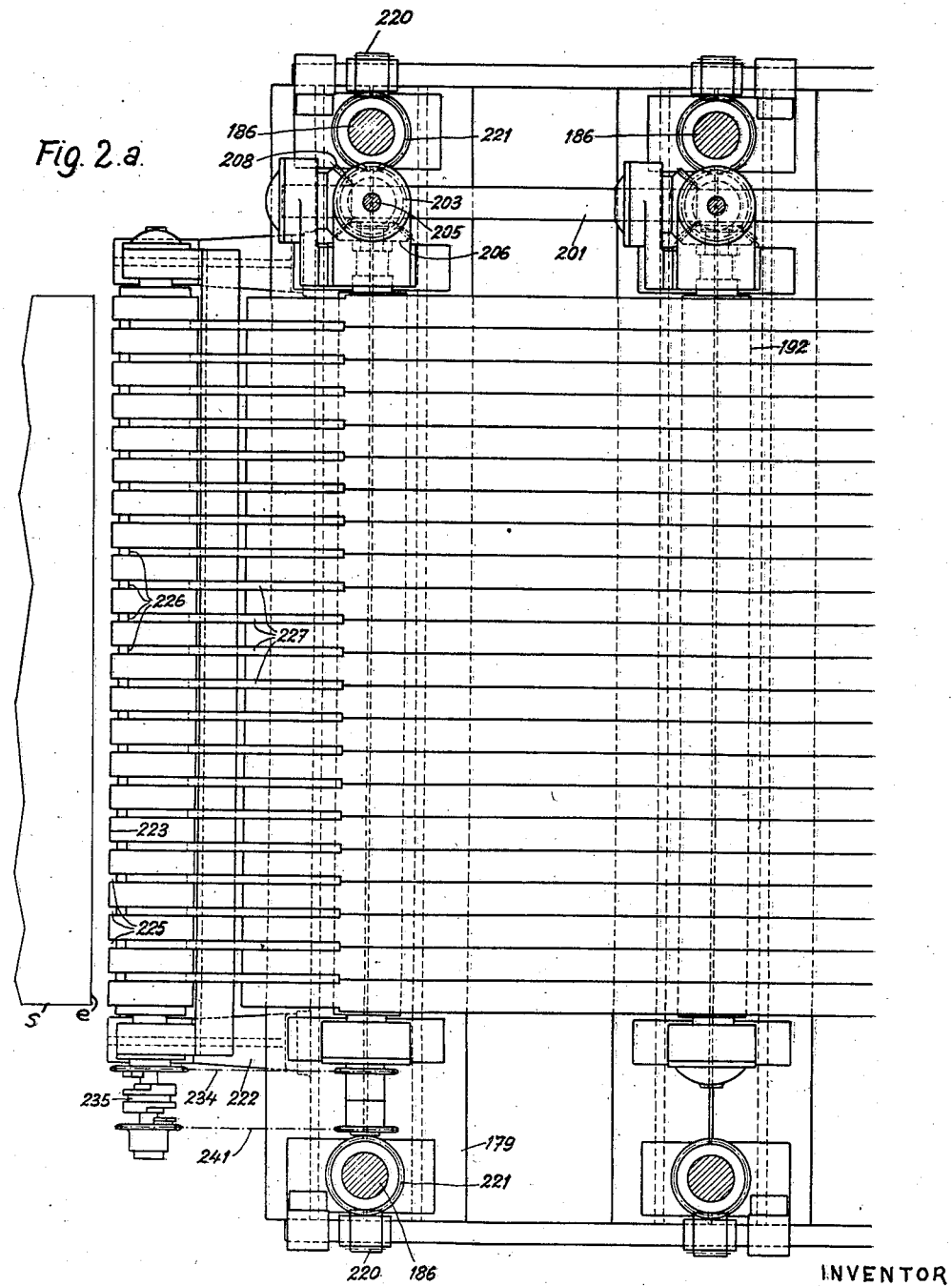

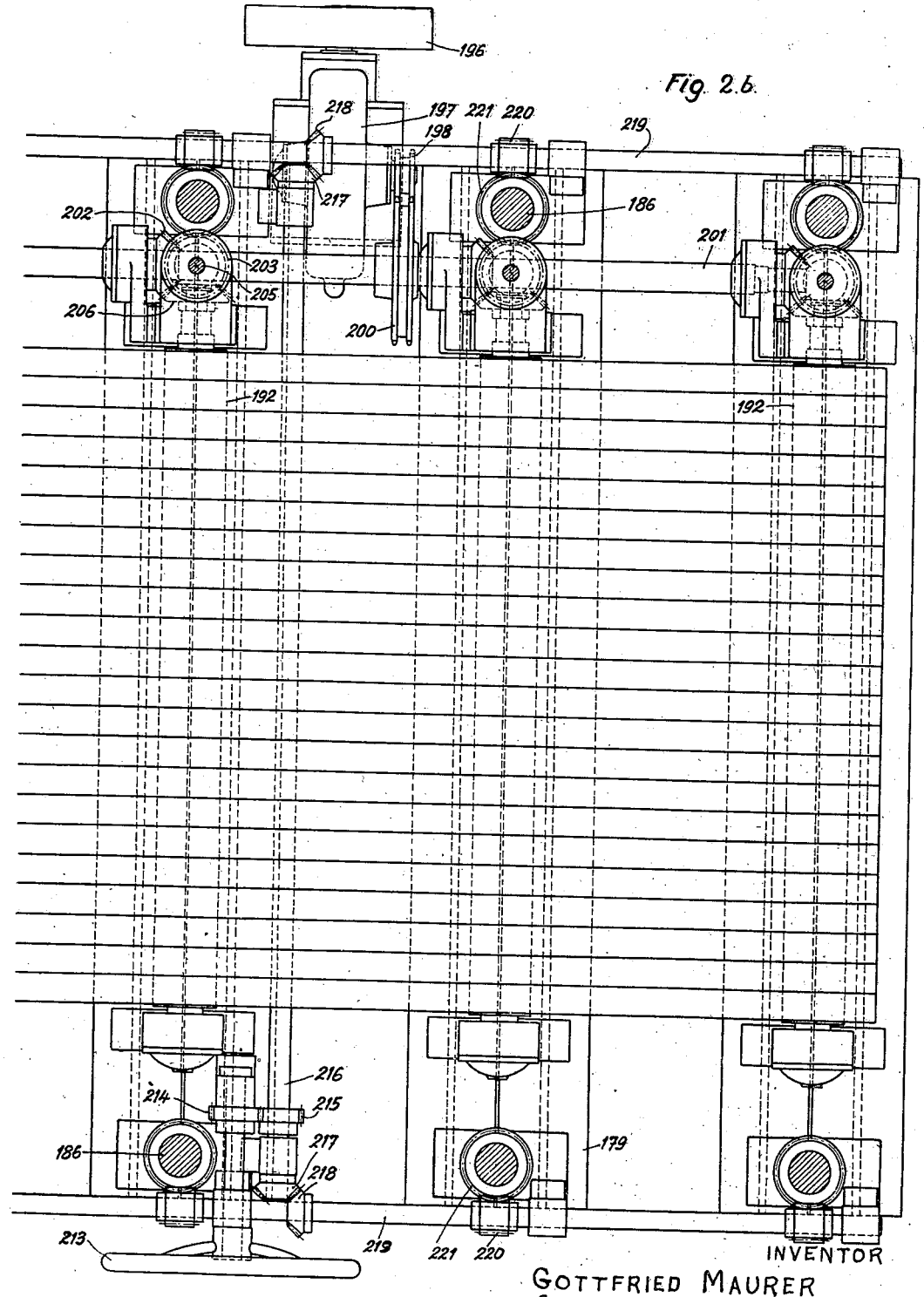
Fig. 2.b.

INVENTOR
GOTTFRIED MAURER

Feb. 1, 1944.　　　　　G. MAURER　　　　　2,340,607
PRESS
Original Filed Dec. 13, 1939　　6 Sheets-Sheet 6

INVENTOR
GOTTFRIED MAURER
BY
Young, Emery & Thompson
ATTYS.

Patented Feb. 1, 1944

2,340,607

UNITED STATES PATENT OFFICE 2,340,607

PRESS

Gottfried Maurer, Zurich, Switzerland, assignor to A. Müller & Cie. Maschinenfabrik und Eisengiesserei Aktiengesellschaft, Brugg, Switzerland, a joint-stock company of Switzerland Original application December 13, 1939, Serial No. 309,099. Divided and this application September 9, 1940, Serial No. 356,091. In Switzerland November 3, 1939

8 Claims. (Cl. 144—281)

This application is a division of application Serial No. 309,099, filed December 13, 1939, now issued as Patent No. 2,271,599, dated February 3, 1942, and, therefore, relates to an apparatus having opposed bars which are caused to grip the goods and to carry them forward and then to release them and to move backward into the outgoing position, and specially to a press in which pressure means are provided allowing a desired pressure to be applied to the goods and in which the bars are arranged on opposed beds whose mutual distance is adjustable in order to adjust the pressure to be applied to the goods by said pressure means. The press is preferably used for working and dressing articles of wood or similar materials, e. g., for pressing and conveying plywood-plates, i. e., for subjecting the glued and joined parts of plywood-plates to a pressure suitable for glue-setting. The press may, for instance, also be used as a joining apparatus for veneers and other wood strips as hereinafter set forth.

An object of the invention is to provide driven friction members adapted to engage the bars whereby these latter are, by friction effect, caused to move forward against the effect of elastic means acting upon the bars and to provide flat portions on the curved surface of said friction members, which, when in juxtaposition to the bars, release these latter from the friction effect of said friction members, allowing them to be moved backward by the elastic means.

The raising of opposed bars from one another during the backward motion into the outgoing position is avoided. The play between the flat portions on the curved surface of the friction members and the goods to be pressed and conveyed is sufficient to allow of the backward motion of the bars. Therefore, a separate mechanism to enable the bars to move toward and away from one another is omitted.

Another object is to mount one bed of bars on a stationary and the other on a movable frame part to enable the distance between the beds to be adjusted and to provide special means for connecting the frames with each other.

Other objects and features will be apparent as the following description proceeds, reference being had to the accompanying drawings in which Figs. 1a and 1b are parts of a side view of an embodiment of the press;

Figs. 2a and 2b are the parts of a horizontal section, taken on line II—II of Figures 1a, 1b;

Figure 1A:
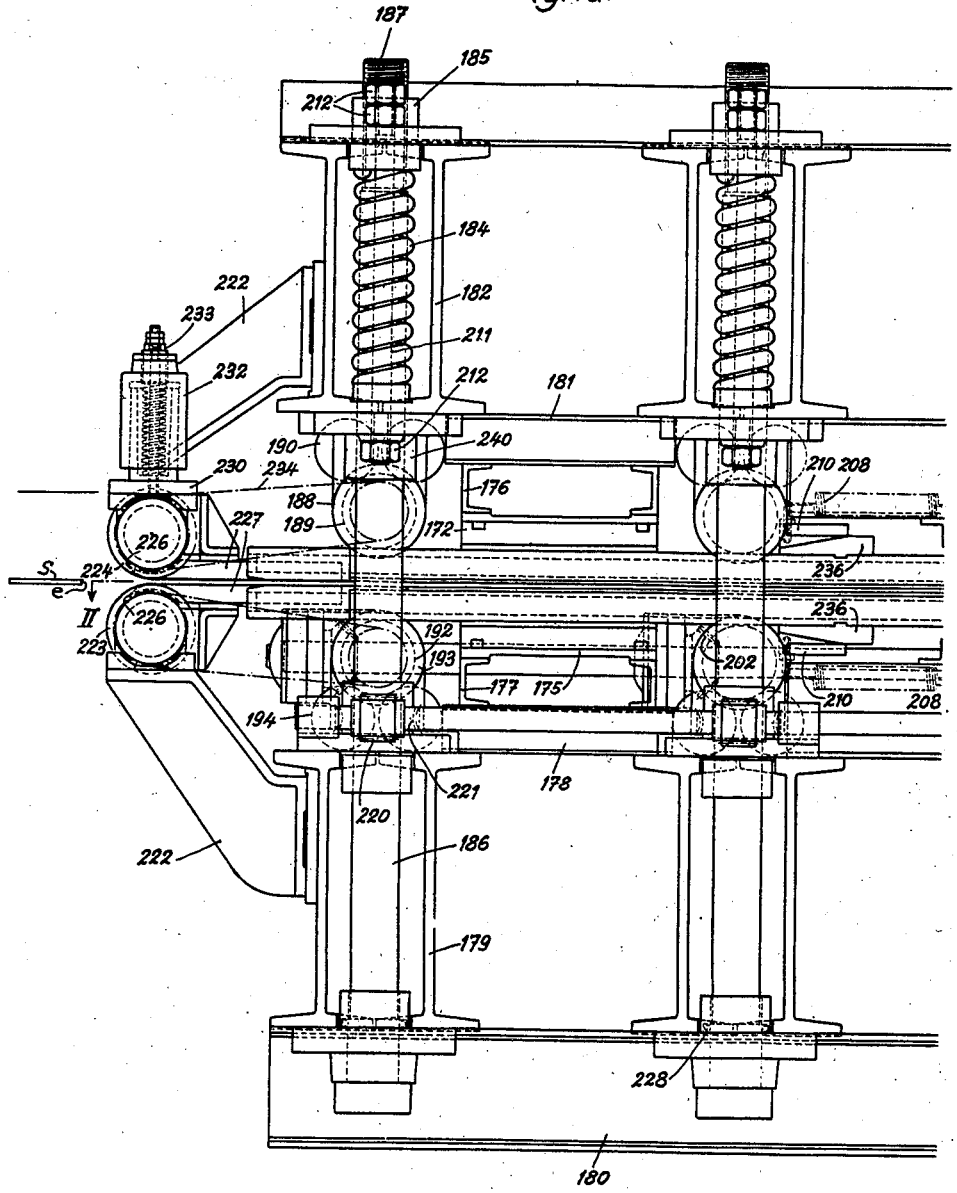
Figure 3A:
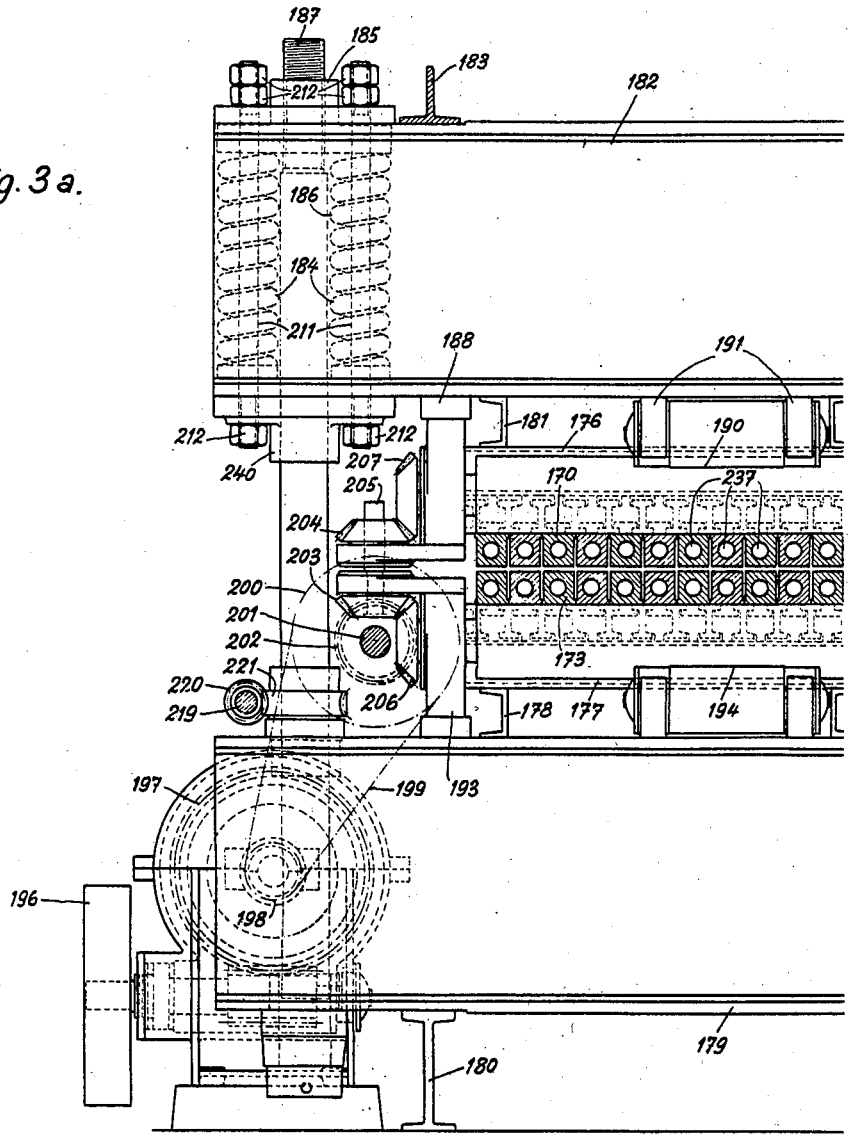
Figs. 3a and 3b are the parts of a section taken on line III—III of Figure 1b.
Figure 4:
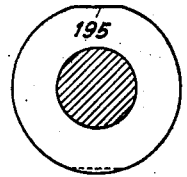
Fig. 4 is a side view of a friction member.

The upper bars 170 which, independent of one another, are capable of longitudinal motion, are guided between the double T-irons 172 by means of the T-irons 171. Play is provided between the irons 171 and 172. The bars 173 of the lower bed, also longitudinally sliding independent of one another, are, in an analogous manner, guided with play between the double T-irons 175 with the help of the T-irons 174. The double T-irons 172 and 175 are secured to the U-cross girders 176, 177. The lower girders 177 are supported by U-irons 178 and the latter by double T-cross girders 179 which, in their turn, rest on double T-foundation girders 180.

The upper cross girders 176 are mounted on longitudinal U-beams 181 fixed to the double T-irons 182. The longitudinal T-beams 183 complete the frame, to which the upper conveying bed is attached. The machine being at work, this frame bears on supports 185 by the intermediary of springs 184. The supports comprise inside threads engaging threads 187 of spindles 186. The latter pass with allowance for sliding, through the eyes 240 of the frame of the upper bed. The supports 185 enter, with play, recesses of the irons 182. Bolts 211 with nuts 212 at their ends, go through the springs. When the machine is out of operation, i. e., when no pressure exists, the frame carrying the upper bed is suspended on the supports 185 with the aid of these bolts.

On every two irons 182 adjacent to each other the bearings 188 for a friction member are mounted. This member is shaped as a roller 189. Four supporting rollers 190, placed on bearings 191 of the irons 182, are provided for each friction roller. The friction members 189 act upon the bars 170 of the upper bed with the pressure necessary for the driving of these bars by friction effect. Similar friction members 192 belong to the lower bed and are carried on bearings 193 of the cross girders 179. These lower members bear against supporting rollers 194.

Figure 5:
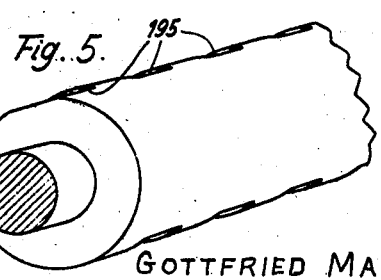
Fig. 5 is a perspective representation of said friction member.
Figure 3B:
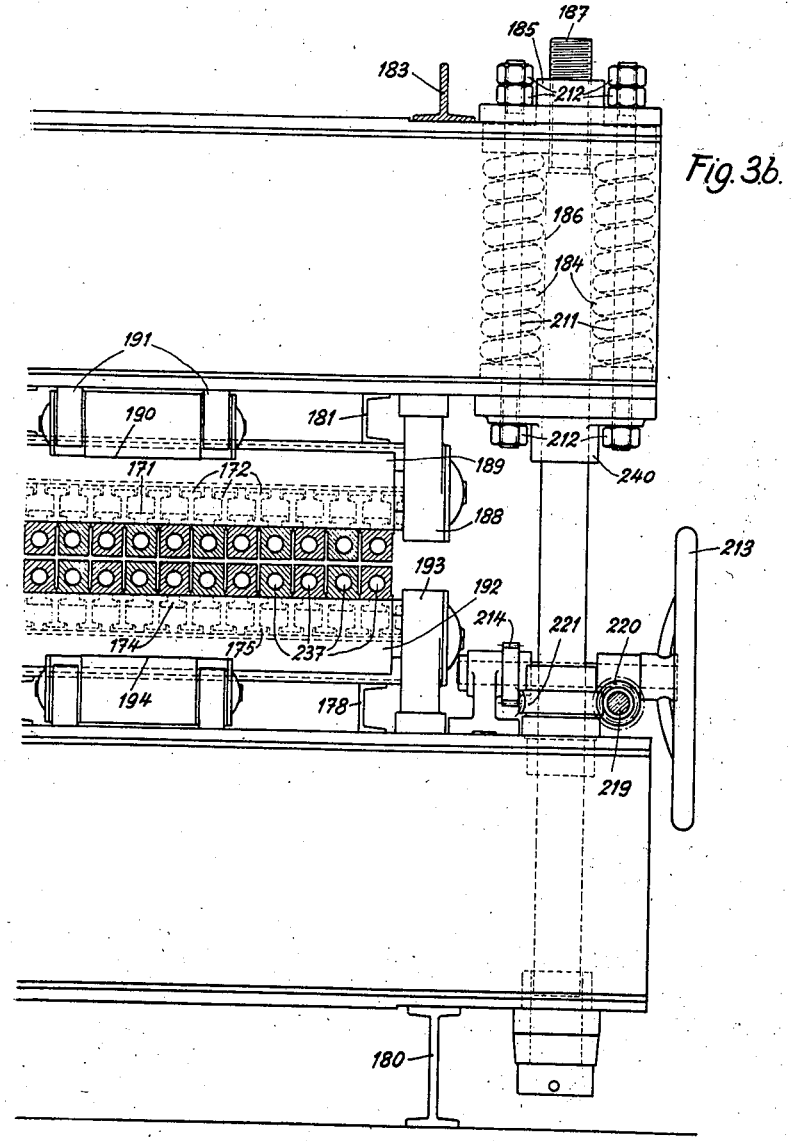
Figure 6:
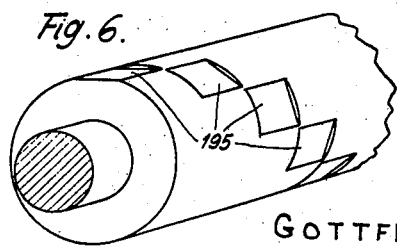
Fig. 6 is a perspective representation of a further embodiment of the friction member.

The curved surface of each friction roller has a flat portion 195 on each superficies zone cooperating with each individual bar. If this flat portion is in juxtaposition to the bar, the latter is released for the backward movement. On the roller shown in Figure 5 the flat portion of every second bar lies between the same generating lines. Diametrically opposite this first flat portion row the flat portion row for the other bars is located. Hence it follows that half the number of bars of each bed is simultaneously released in order to perform the backward motion. It is understood that the arrangement of these flat portions on the curved surface of the rollers might be of any other kind. They may, for instance, be displaced from each other, so as to lie along a helical curve, whereby several pitches of the latter may be provided on the whole length of the roller. Hence, during the rotation of the roller, as many bars will be released simultaneously for the backward movement as there are pitches of the helical curve. Such a roller is illustrated in Figure 6. The drive of each friction roller is as follows:

Worm gear 197 is driven by a driving device, not shown, for instance, a motor or a transmission driving shaft, by means of belt pulley 196. The rotation is transmitted, with the aid of two chains 199, from double chain wheel 198 of the gear wheel shaft to double chain wheel 200 of countershaft 201 extending over the whole length of the machine. Bevel wheels 202, each driving a pair of friction rollers, are fixed to shaft 201. For this purpose each of these bevel wheels cooperates through bevel wheels 203, 204 of a vertical countershaft 205 with bevel wheels 206, 207 of the lower or upper friction roller shaft respectively. The bevel wheels 204 are arranged on shafts 205 with allowance for axial sliding, either by means of a square driving head or by means of a slide wedge. All the friction rollers rotate at the same speed.

Tension springs 208 act upon each bar of the upper and lower bed. One end of each of these springs is fixed to the webs of section iron pieces 209 each being attached to one of the bars, while the other spring ends are fixed to any parts of the machine frame, e. g. to the stop irons 210 described later on. Thus it follows that the tension springs always tend to contract themselves and, thereby, to push the bars to the left, i. e., opposite the direction in which these latter are moved by the rollers 189, 192 respectively.

The stop irons 210 fixed to the frame and extending over the whole width of the beds stop the left hand motion of the bars by the pieces 236, fixed to the bars, striking against them. The cooperating surfaces of the irons 210 and of the pieces 236 are inclined in order to diminish the noise occurring when they knock against each other.

In order to allow the pressure of the beds applied to the goods to be changed, the tension of springs 184 must be adjustable. For this purpose and in order to permit the mutual distance of the beds to be altered, the vertical spindles 186 are adapted to rotate in both directions and are supported on step bearings 228. By the rotation of the spindles either the frame supporting the upper bed is moved up- or downwards, or, in case the frame can no longer be moved downwards, the tension of the springs 184 is increased. Hand wheel 213 is provided for driving the spindles 186. By this hand wheel and through gear wheels 214 and 215 a countershaft 216, extending across the machine, is moved. Bevel wheels 217 are keyed on the ends of shaft 216, cooperating with bevel gears 218 of worm shafts 219 extending over the whole length of the machine. Worms 220 secured to said worm shafts engage worm wheels 221 of the vertical spindles 186.

At the left end of Figs. 1a and 2a a feeding device for the goods is illustrated. The grooved feed rollers 223 and 224 are placed on supports 222 fixed to the outer left hand cross girders. The arched ends 226 of connecting pieces 227 enter grooves 225 of the feed rollers, while the other ends of said pieces 227 enter between two adjacent bars of the beds. The outer pair of friction rollers 189 drives the feed rollers by means of chain drives 234 or 241. By the coupling 235 either drive 234 or drive 241 can be engaged. Drives 241 impress a circumferential velocity on the feed rollers of a higher amount than the rate of feed of the bars. If the feed rollers are driven by chain gear 241 they work as a veneer joining apparatus. In this case, namely, the veneers with the direction of fibres transverse to the feed direction, can be glued together. Owing to this higher circumferential velocity the joints of the veneers are pressed together in a horizontal direction. This veneer joining takes place as follows: In Figs. 1a and 2a a veneer s is shown, to the edge e of which glue has previously been applied by a device not shown. This veneer s is now inserted, e. g., by hand, between the feed rollers 223 and 224. These rollers now feed the veneer between the bars 170 and 173, between which previously inserted veneers are moving forward. As the circumferential speed of the feed rollers is higher than the speed of the bars and thus of the veneers between the bars, the freshly fed veneer s is placed with its glued edge e against the edge of the hindmost veneer between the bars, between which bars the veneers are subjected to a suitable pressure and in this way the veneers are glued together.

The bars of the beds are provided with central bores 237 adapted to receive a heating medium necessary, e. g., for the setting of glue on veneers or plywood-plates conveyed through the press.

The manner of action of this embodiment of the press is as follows:

Friction rollers 189 rotate in a counterclockwise and friction rollers 192 in a clockwise direction. The bars and the goods clamped between them, e. g., plywood-plates, are moved to the right by these rollers until the flat portions being in juxtaposition to the bars. In this position the bars have such a play between the flat portions and goods that they can be returned by springs 208 which, during the right-hand movement of the bars have been loaded. This backward motion is stopped by the irons 210 and the pieces 236. In the meantime, the flat portions have left their juxtaposition to the bars and, through friction effect, the latter are again moved to the right by rollers 189 and 192. If a roller according to Figure 5 is used the bars of each bed are divided into two groups. While one group is pushed back by the springs 208, the other group, clamping the goods, is moved to the right. In that embodiment, however, where the flat portions are arranged along a helical curve (Fig. 6), only as many bars jerk back simultaneously as there are pitches of the helical line. While these bars are again carried to the right by the rollers, the next bar of each pitch returns to the left. Hence it follows that, by a suitable arrangement of the flat portions on the curved surface of the friction members, various motions of the bars of each bed can be chosen at will.

The feed rollers 223, 224, which, by gear 234 are normally driven at a circumferential speed equal to the rate of feed of the bars, seize the goods and carry them to the beds.

By rotating hand wheel 213, the distance corresponding to the thickness of the goods has been given to the beds and the desired pressure has been adjusted. If, for instance, plywood-plates are treated with the press, i. e., if the several glued and joined parts of plywood-plates are to be subjected to a pressure suitable for the setting of the glue, the distance of the bar-beds must be adapted to the thickness of the plywood-plates to be treated, i. e., the distance of the beds must, firstly, be sufficient to make room for the plywood plates and, secondly, of such an amount that the springs 184, by means of the friction members and the bars, exert on the plywood-plates the pressure desired, the amount of which is dependent on the compression of the springs 184.

From the drawings and the description the exceedingly simple construction of this embodiment may easily be seen, namely, simple supporting of the bars and an ingenious driving of the latter by means of springs or other elastic means and by friction members. The manufacturing of the latter is, in preferred embodiment, particularly simple and cheap. Only cylindrical rollers have to be turned and the flat portions then milled at the places desired.

While this embodiment of the invention has been illustrated and described in such detail as to enable any one skilled in the art to practise the invention, nevertheless it is to be understood that the invention is not to be limited to any of the details disclosed, but, instead, it will be understood that the invention embraces such embodiments of the broad idea as fall within the scope of the subjoined claims, it being obvious that various changes may be made without departing from the spirit of the invention.

What I claim is:

1. In a press having a frame and two opposed beds of movable bars mounted on said frame and pressing against the article to be treated, driven rotatable members mounted on said frame, said members having a curved surface frictionally engaging said bars to move the latter in one direction, flat portions on said rotatable members to permit movement of said bars in the opposite direction, and elastic means fixed to said bars and to said frame to move said bars in the other direction when said flat portions come in juxtaposition to said bars.

2. In a press having a frame and two opposed beds of movable bars mounted on said frame and pressing against the article to be treated, driven rotatable members mounted on said frame, said members having a curved surface frictionally engaging said bars to move the latter in one direction, flat portions on said rotatable members to permit movement of said bars in the opposite direction, elastic means fixed to said bars and to said frame to move said bars in the other direction when said flat portions come in juxtaposition to said bars, and stop means on the frame and bars adapted to limit the bar movement caused by said elastic means.

3. In a press having a frame and two opposed beds of movable bars mounted on said frame and pressing against the article to be treated, means for moving one of said beds toward and away from the other bed in order to adjust the distance between said beds, driven rotatable members mounted on said frame, said members having a curved surface frictionally engaging said bars to move the latter in one direction, flat portions on said rotatable members to permit movement of said bars in the opposite direction, and elastic means fixed to said bars and to said frame to move said bars in the other direction when said flat portions come in juxtaposition to said bars.

4. In a press having a frame and two opposed beds of movable bars mounted on said frame and pressing against the article to be treated, means for moving one of said beds toward and away from the other bed in order to adjust the distance between said beds, driven rotatable members mounted on said frame, said members having a curved surface fractionally engaging said bars to move the latter in one direction, flat portions on said rotatable members to permit movement of said bars in the opposite direction, elastic means fixed to said bars and to said frame to move said bars in the other direction when said flat portions come in juxtaposition to said bars, and stop means on the frame and bars adapted to limit the bar movement caused by said elastic means.

5. In a press having a frame and two opposed beds of movable bars mounted on said frame and pressing against the article to be treated, driven rotatable rollers mounted on said frame, said rollers having a curved surface frictionally engaging said bars to move the latter in one direction, flat portions arranged along a helical curve on said rotatable rollers to permit movement of said bars in the opposite direction, springs fixed to said bars and to said frame to move said bars in the other direction when said flat portions come in juxtaposition to said bars, and stop means on the frame and bars adapted to limit the bar movement caused by said springs.

6. In a press, a frame having a stationary part and a movable part, two opposed beds of movable bars pressing against the article to be treated, one of said beds being mounted on said stationary part and the other bed on said movable part, rotatable threaded spindles connecting said movable part with said stationary part and being capable of moving said movable part toward and away from said stationary part, driven rotatable members mounted on said frame, said members having a curved surface frictionally engaging said bars to move the latter in one direction, flat portions on said rotatable members to permit movement of said bars in the opposite direction, springs fixed to said bars and to said frame to move said bars in the other direction when said flat portions come in juxtaposition to said bars, and stop means on the frame and bars adapted to limit the bar movement caused by said springs.

7. In a press, a frame having a stationary part and a movable part, two opposed beds of movable bars pressing against the article to be treated, one of said beds being mounted on said stationary part and the other bed on said movable part, rotatable threaded spindles connecting said movable part with said stationary part and being capable of moving said movable part toward and away from said stationary part, threaded supports engaging said threaded spindles, helical springs adapted to transmit to said supports the pressure applied to said movable part when pressing, driven rotatable members mounted on said frame, said members having a curved surface frictionally engaging said bars to move the latter in one direction, flat portions on said rotatable members to permit movement of said bars in the opposite direction, springs fixed to said bars and to said frame to move said bars in the other direction when said flat portions come in juxtaposition to said bars, and stop means on the frame and bars adapted to limit the bar movement caused by said springs.

8. In a press having a frame and two opposed beds of movable bars mounted on said frame and pressing against the article to be treated, driven rotatable members mounted on said frame, said members having a curved surface frictionally engaging said bars to move the latter in one direction, flat portions on said rotatable members to permit movement in the opposition direction, springs fixed to said bars and to said frame to move said bars in the other direction when said flat portions come in juxtaposition to said bars, stationary members fixed to said frame, and portions secured to said bars adapted to limit the bar movement caused by said springs by striking against said stationary members.

GOTTFRIED MAURER.